N. SIMON.
PROCESS OF FORMING BLOCKS OF CHEESE.
APPLICATION FILED NOV. 3, 1919.
1,393,915.
Patented Oct. 18, 1921.
2 SHEETS—SHEET 2.
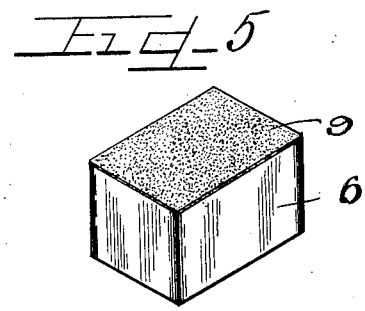
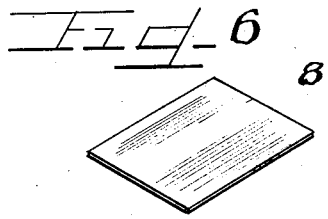
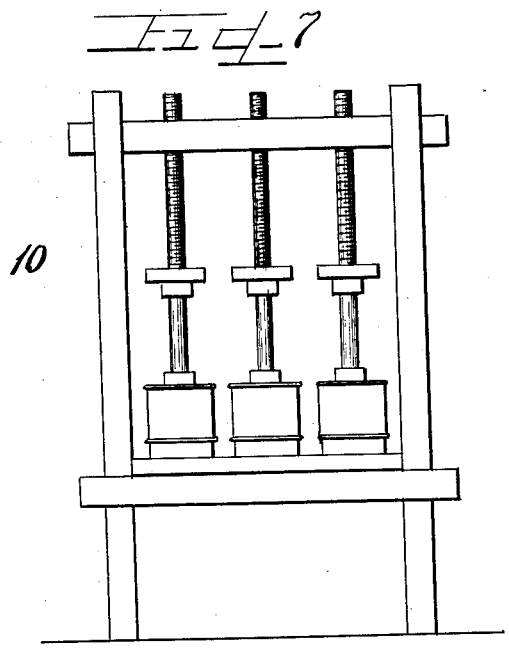
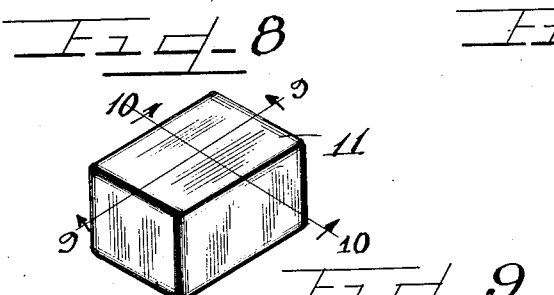
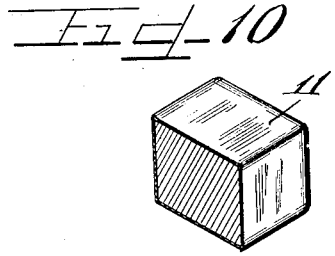
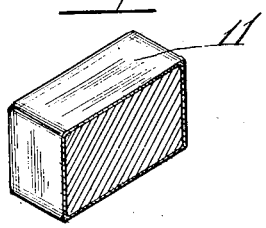
Inventor
NICHOLAS SIMON.

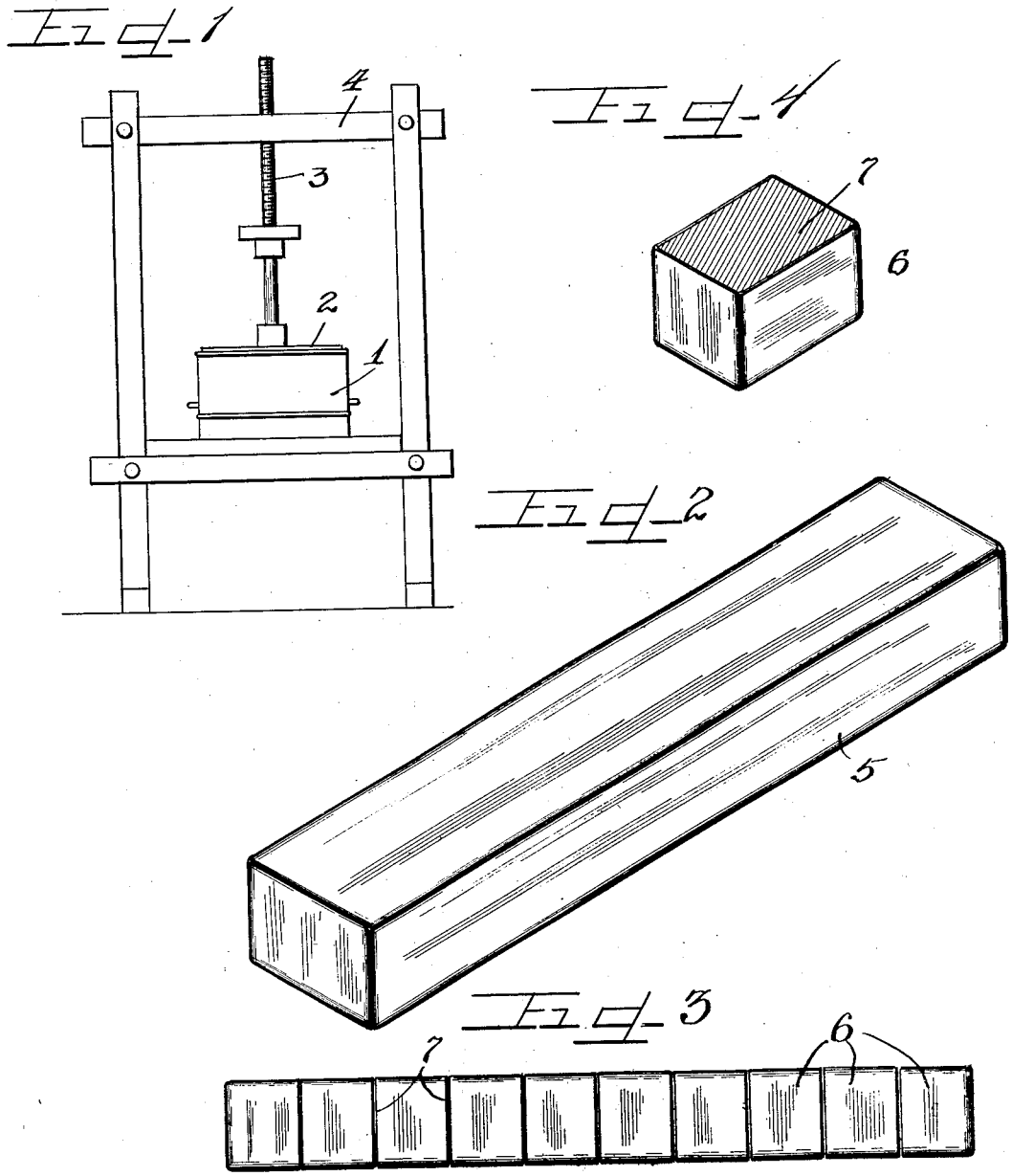

UNITED STATES PATENT OFFICE.

NICHOLAS SIMON, OF APPLETON, WISCONSIN.

PROCESS OF FORMING BLOCKS OF CHEESE.

1,393,915.

Specification of Letters Patent.  Patented Oct. 18, 1921.

Application filed November 3, 1919. Serial No. 335,358.

*To all whom it may concern:*

Be it known that I, NICHOLAS SIMON, a citizen of the United States, and a resident of the city of Appleton, in the county of Outagamie, in the State of Wisconsin, have invented certain new and useful Improvements in Processes for Forming Blocks of Cheese; and I do hereby declare that the following is a full, clear, and exact description of the same, reference being had to the accompanying drawings, and to the numerals of reference marked thereon, which form a part of this specification.

This invention relates to a method of preparing blocks of cheese of standard weight each having a rind completely inclosing it, said blocks being cut from a long bar of cheese formed as closely as possible of uniform density and partly cured.

When a long bar of cheese, for instance, a 10 pound bar is divided into, say 10 blocks if the cheese is of substantially uniform density the block will weigh one pound each, but if the density of the cheese varies necessarily the weight of each block will vary accordingly. Those weighing more than one pound readily may be shaved off until the weight is correct, but increasing the weight of those under weight is a much more difficult problem. Furthermore, if the blocks are cut after curing is completed, no rind is formed over the cut surface or surfaces, which will dry and crack allowing bacteria to enter and moisture to evaporate.

It is an object, therefore, of this invention to provide a method for making blocks of cheese of standard weight from a larger mass of cheese, each block having a rind completely inclosing it.

Another object of the invention is to provide a method for increasing or decreasing the weight of blocks of cheese to bring them up to standard weight, each block being homogeneous throughout and free from cracks or seams.

Other and further important objects of this invention will be apparent from the disclosures in the specification and drawings.

The invention (in a preferred form) is illustrated in the drawings and hereinafter more fully described.

In the drawings:

Figure 1 is an elevation of a press for making a bar of cheese.

Fig. 2 is a perspective view of a bar of cheese after being cured.

Fig. 3 is a side view of the same after cutting it into separate blocks.

Fig. 4 is a perspective view of one of the blocks so formed.

Fig. 5 is a perspective view of one of the blocks with granulated cheese placed thereon ready for pressing.

Fig. 6 is a perspective view of a cheese shaving from an overweight block.

Fig. 7 is an elevation of a press for the cheese blocks, as shown in Fig. 5.

Fig. 8 is a perspective view of one of the completed and cured blocks.

Fig. 9 is a section on the line 9—9, of Fig. 8.

Fig. 10 is a section on the line 10—10 of Fig. 8.

As shown in the drawings:

Sufficient cheese to make a bar of the desired weight, in the present case 10 lbs., after being surrounded by the usual covering of cheese cloth, is placed in the pan or mold 1. The press plate 2 is then forced down onto the mold by the screw 3 having threaded engagement with the frame 4 of the press.

After forming the bar of cheese 5, it is then partly cured and when that has proceeded far enough to form a substantial rind the bar is cut into ten substantially equal sections or blocks 6, as shown in Fig. 3. It will be evident that each block has at least one fresh cheese surface 7.

Each block 6 is then weighed and all those weighing over one pound are shaved or scraped to bring their weight down to one pound when they are cured. Those weighing less than a pound are put on the scales with the fresh cheese surface uppermost and cheese shavings 8, scrapings or granulated cheese 9 placed on such surface until the weight is brought up to such an amount that the block will weigh one pound when cured. Instead of cutting the large blocks of partly cured cheese into smaller blocks of substantially equal sections, it may be found desirable to grind the partly cured cheese and form smaller blocks therefrom in separate molds such as are shown in Fig. 7, these smaller blocks being subsequently cured to form a rind completely around each. The blocks are then wrapped in cheese cloth and placed in the press 10. The construction of such presses is so well known to those skilled in the art that it need not be described in detail.

The pressed block is then cured to give the completed block 11, all surfaces of which are covered by the usual rind, as will be seen by inspection of Figs. 9 and 10.

It will be evident that herein is provided a new article of manufacture which is particularly adapted to the requirements of retail dealers in such cheeses; the one-pound blocks can be sold integral, and larger blocks, such as those weighing five pounds, may be cut up by the dealer with greater ease and much less waste than is ordinarily possible with the large cheeses now on the market. These large cheeses weigh anywhere from ten to thirty or forty pounds and are usually cut in sections or wedges and it necessarily follows that one side of the cheese will dry out and crack and subsequently become wasted. The smaller blocks, ordinarily used by the retailer, weigh about five pounds each and can be readily cut up into equal sections of one or one-half pounds and as such are more easily distributed and find a very ready sale.

The wrapping of the block in cheese cloth followed by pressing results in the formation of a rind.

It will be understood that if the bar of cheese 5 is made of substantially uniform density throughout, the cutting of the same into blocks will produce blocks of substantially equal weight, which will require no addition or subtraction thereto, but it has been found ordinarily in the manufacture of cheese that this desideratum cannot always be attained, and for that reason, recourse, when necessary, is had to shaving the blocks, which are over-weight, and adding cheese to the blocks which are under-weight.

I am aware that numerous details of construction may be varied through a wide range without departing from the principles of this invention, and I therefore do not purpose limiting the patent granted otherwise than necessitated by the prior art.

I claim as my invention:

The process of preparing blocks of cheese of standard unitary weight, which consists in forming and partly curing a mass of cheese of definite size, then cutting this mass into a number of blocks of substantially equal size then adjusting, if necessary, the weight of said blocks to the predetermined standard by adding or subtracting, as required, pieces of partly cured cheese, and finally completing the cure of such blocks to produce a rind completely inclosing the same.

In testimony whereof I have hereunto subscribed my name in the presence of two subscribing witnesses.

NICHOLAS SIMON.

Witnesses:
 IRENE MILLER,
 H. E. FORNOW.